US012131722B2

(12) United States Patent
Patterson

(10) Patent No.: US 12,131,722 B2
(45) Date of Patent: Oct. 29, 2024

(54) WEARABLE MUSIC SYSTEM

(71) Applicant: Matthew T. Patterson, Henderson, NV (US)

(72) Inventor: Matthew T. Patterson, Henderson, NV (US)

( * ) Notice: Subject to any disclaimer, the term of this patent is extended or adjusted under 35 U.S.C. 154(b) by 39 days.

(21) Appl. No.: 18/245,108

(22) PCT Filed: Sep. 22, 2022

(86) PCT No.: PCT/US2022/044390
§ 371 (c)(1),
(2) Date: Mar. 13, 2023

(87) PCT Pub. No.: WO2023/049266
PCT Pub. Date: Mar. 30, 2023

(65) Prior Publication Data
US 2023/0274721 A1    Aug. 31, 2023

Related U.S. Application Data

(60) Provisional application No. 63/247,455, filed on Sep. 23, 2021.

(51) Int. Cl.
*G10G 5/00* (2006.01)
(52) U.S. Cl.
CPC .................................... *G10G 5/005* (2013.01)
(58) Field of Classification Search
CPC .................................................... G10G 5/005
See application file for complete search history.

(56) References Cited

U.S. PATENT DOCUMENTS

| 3,848,944 A * | 11/1974 | Gilmer, Jr. ............. A47B 19/00 |
| | | 381/75 |
| 5,065,661 A | 11/1991 | Hacker |
| 5,076,131 A | 12/1991 | Patterson |
| D388,246 S | 12/1997 | Patterson |
| 6,031,166 A | 2/2000 | Petrarca |
| D512,044 S | 11/2005 | Esslinger et al. |
| 7,420,110 B2 | 9/2008 | May |

(Continued)

FOREIGN PATENT DOCUMENTS

| CN | 204411714 U * | 6/2015 |
| JP | 2003280642 | 10/2003 |

OTHER PUBLICATIONS

PCT/US2022/044390 International Search Report and Written Opinion dated Jan. 10, 2023. 11 pages.

(Continued)

*Primary Examiner* — Jianchun Qin
(74) *Attorney, Agent, or Firm* — Concourse Law Group; Katherine B. Sales, Esq.

(57) ABSTRACT

A wearable music system having a "Y" shaped harness, a housing, a rotatable platform coupled to the housing, and a bracket coupled to the rotatable platform. The harness comprises two curved pieces, a central section coupled to the two curved pieces, a first vertical support coupled to the central section, the first vertical support having a plurality of holes there through, and a second vertical coupled to the first vertical support, the second vertical support having a plurality of holes there through. The housing has a rear surface, a bottom surface, and two side surfaces.

20 Claims, 13 Drawing Sheets

(56) References Cited

U.S. PATENT DOCUMENTS

| | | | | |
|---|---|---|---|---|
| 7,810,684 B2* | 10/2010 | May | ............... | G10G 5/005 |
| | | | | 224/265 |
| 8,093,479 B2* | 1/2012 | Schafer | ............ | G10G 5/005 |
| | | | | 84/421 |
| 8,385,504 B2 | 2/2013 | Hattrup et al. | | |
| 9,532,121 B2 | 12/2016 | Parker et al. | | |
| 9,849,901 B2 | 12/2017 | Jackman | | |
| 10,958,997 B2 | 3/2021 | Chamberlin et al. | | |
| 2009/0241755 A1 | 10/2009 | Yoshino et al. | | |
| 2014/0370817 A1* | 12/2014 | Luna | ............ | H04W 8/005 |
| | | | | 455/41.3 |
| 2016/0225355 A1 | 8/2016 | Shigenaga | | |

OTHER PUBLICATIONS

JBL PartyBox On-The-Go Retrieved from: https://www.jbl.com/party-speakers/PARTYBOX-ON-THE-GO-.html Published at least as early as Jan. 19, 2021.

* cited by examiner

WEARABLE MUSIC SYSTEM

CROSS-REFERENCE TO RELATED APPLICATIONS

This application is a national phase entry of PCT Application No. PCT/US2022/044390, titled "Wearable Music System," filed Sep. 22, 2022, which claims priority to U.S. Provisional Patent Application No. 63/247,455, titled "Portable Music System," filed Sep. 23, 2021, the contents of which are incorporated by reference herein in their entirety.

BACKGROUND

It is difficult to utilize electronic instruments in marching bands because they require the use of both a portable PA (public address) system or sound reinforcement system, and a wireless audio transmitter system in order to meet minimum functionality requirements.

It is complicated by the fact that the sound reinforcement system is bulky and heavy, making it inconvenient for true portability and mobility, and the audio wireless transmitter system is subject to signal interference such as dropouts. Moreover, the musician lacks the ability to properly monitor the audio return from the PA, making it subject to increased latency as the distance from the speaker is increased.

Accordingly, there is a need for an improved portable, wearable music system.

SUMMARY

The present invention is directed to a wearable music system comprising a "Y" shaped harness, a housing, a rotatable platform coupled to the housing, and a first bracket coupled to the rotatable platform.

The harness comprises two curved pieces, a central section coupled to the two curved pieces, a first vertical support coupled to the central section, the first vertical support having a plurality of holes there through, and a second vertical coupled to the first vertical support, the second vertical support having a plurality of holes there through.

The housing comprises a rear surface, a bottom surface, and two side surfaces.

Optionally, the housing has a top surface that has at least one AC power socket, an on/off switch, at least one USB port, at least one volume control knob, and at least one audio input.

The housing can further comprise a water-resistant cover that can pivot between an open position revealing the top surface of the housing, and a closed position wherein the top surface of the housing cannot be accessed, and an upper chamber, a middle chamber and a lower chamber.

The upper chamber can have an AC adapter located therein.

The middle chamber can have at least one speaker coupled to the front surface of the housing, at least one battery and/or battery pack, an amplifier and a subwoofer.

The lower chamber is the chamber into which the subwoofer projects sound, and it can have a sound outlet port.

Optionally, the harness further comprises a support plate coupled to at least one of the supports, and the rear surface of the housing can comprise two holders. Two J-hooks can couple the holders of the housing to the support plate of the harness.

The first bracket can comprise a flat portion and a rear lip, and the flat portion of the bracket is configured to couple to the cover of the housing.

Optionally, the first bracket comprises a flat portion and a front angle portion, wherein the flat portion is configured to couple to the rotatable platform.

Optionally, the first bracket only comprise a flat portion for coupling to the rotatable platform.

The housing can comprise at least one battery or battery pack, at least one inverter, and optionally, at least one amplifier.

There can be at least one speaker coupled to an outside surface of at least one of the side surfaces of the housing.

Optionally, the system further comprises a pair of arms coupled to each side of the housing, wherein the platform is coupled to the arms, and the first bracket is coupled to the rotatable platform.

Optimally, the system further comprises a fully adjustable rack. The fully adjustable rack has a pair of horizontal arms that have a first end coupled to the first bracket, a pair of vertical arms, wherein the first end of the vertical arms are rotatably coupled to a second end of the horizontal arms, and a pair of holders rotatably coupled to a second end of the vertical arms.

BRIEF DESCRIPTION OF THE DRAWINGS

These and other features, aspects, and advantages of the present invention will become better understood with regard to the following description, appended claims, and accompanying drawings.

DESCRIPTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Figure 1:
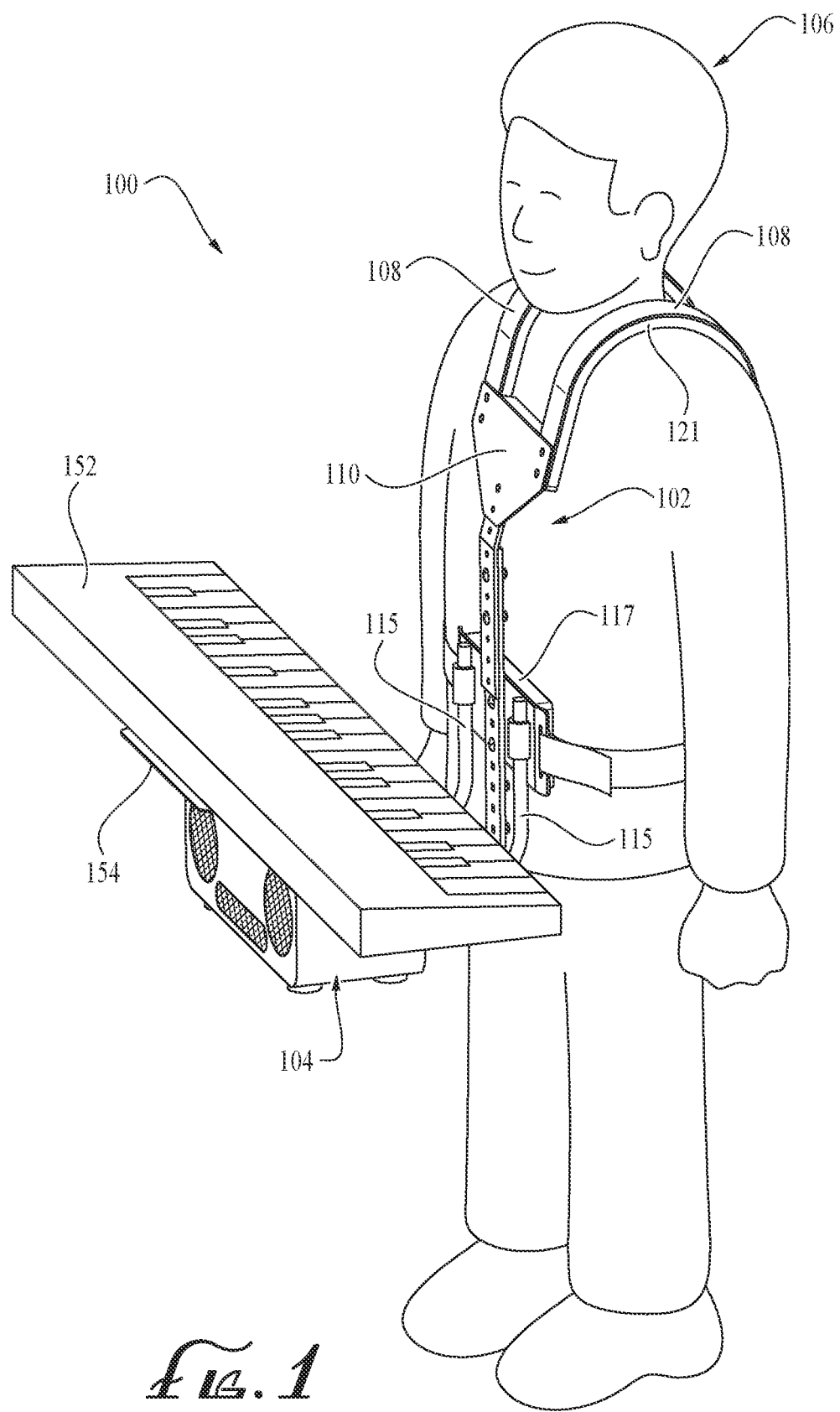
FIG. 1 is a perspective view of a first embodiment of a wearable music system having features of the present invention.

Referring now to FIGS. 1 through 5, there is shown a first embodiment 100 of the present invention, which is directed to a portable, wearable music system 100. The system 100 comprises a carrier harness 102 and at least one housing 104. FIG. 1 shows the system 100 being worn by a user 106.

The harness 102 is a marching band style harness that preferably is "Y" shaped, having two curved pieces 108 for resting on the shoulders of a user 106, a central section 110, a first vertical support 112, and if necessary, a second vertical support 114. The harness 102 can be made from metal such as aluminum, titanium or similar lightweight alloy metal, wood, plastic, or a composite material, such as a plastic composite, metal composite or carbon/carbon fiber composite, or a metallic material that can be made via 3-D printing, and any combination of the foregoing.

The two curved pieces 108 are coupled to and extend away from an upper edge of the central section 110, and the first vertical support 112 is coupled to an extends away from a lower edge of the central section 110. The central section 110 can be any shape, such as triangular, rectangular, hexagonal, or circular and is not limited to the shape shown in figures. The second vertical support 114 removably and adjustably couples to the first vertical support 112 to provide a means to adjust the placement of the housing 104 when coupled to the supports 112, 114. Both the first and second vertical supports 112, 114 each have a plurality of holes 116 (for use with a plurality of fasteners) to facilitate their removable and adjustable coupling to each other. The fasteners can be screws, bolts, coder pins or any other type of mechanical fastener that could be used to removably couple the supports 112, 114 to each other. The vertical supports 112, 114 can be any shape, but as shown in figures, the supports 112, 114 are typically flat, rectangular pieces of material.

The harness 102 allows the entire housing 104 (and musical instrument supported therefrom) to be worn/carried by the user 106 on their body, while keeping their hands free. The harness 102 provides vertical adjustability (via supports 112, 114) to accommodate users 106 of different heights. The harness 102 is also adjustable at the shoulders (via curved pieces 108) to accommodate users 106 having different sized shoulders. There can be padding 121 along an interior surface of the curved pieces 108, central section 110, and optionally supports 112, 114 for added comfort. The padding 121 can be neoprene or a similar material compressible material.

The housing 104 has a front surface 109 that is distal the user 106, a rear surface 111 that is proximate the user 106, two opposed side surfaces 113, a bottom surface, and top surface 122. Preferably there is a hinged cover 120 that can pivot between a closed position shown in FIGS. 2 and 3 and an open position shown in FIGS. 4 and 5. The cover 120 covers the top surface 122 of the housing 104, and preferably is water resistant such that the cover 120 seals to the housing 104 with a rubber seal and/or O-ring. Ideally the cover 120 also comprises a locking mechanism to securely lock the cover 120 closed.

The front surface 109 can have at least one cable port 136 that allows power and/or audio cables to pass into and out of the housing 104. Preferably the cable port(s) 136 is water resistant so that it will be difficult for water to enter the interior of the housing 104.

The top surface 122 of the housing 104 has at least one AC power socket 124, an on/off switch 126 for turning the system 100 on and off, at least one USB port 128, at least one volume control knob 130 (preferably one for each channel, so if there are two channels, there are two volume control knobs 130), and at least one, but preferably a plurality, of audio inputs 132. The audio inputs 132 can also include at least one microphone/line input. The top surface 122 of the housing can also have at least one headphone jack 139.

Optionally, the top surface 122 of the housing 104 also has at least one equalizer knob 133, and preferably there is one equalizer knob 133 for each channel. The equalizer knobs 133 controls the equalizer, which is an audio filter that isolates certain frequencies and either boosts them, lowers them, or leaves them unchanged.

Optionally, the top surface 122 of the housing 104 also has at least one microphone knob 135, and preferably there is one microphone knob 135 for each channel. The microphone knobs 135 control the respective microphones associated with each channel that are connected to the respective mic/line inputs 132.

Optionally, the top surface 122 of the housing 104 also has at least one tone knob 137 for controlling the tone of the music being played by the system 100. The tone knob 137 is a potentiometer that dials in frequency or removes it from the sound spectrum. The lower the tone knob 137 is set, the more the high frequencies are cut out from the musical signal to the amplifier. All of the above electrical components discussed with respect to the housing 102 are electrically coupled to each other as would be understood by one of ordinary skill in the art.

Figure 4:
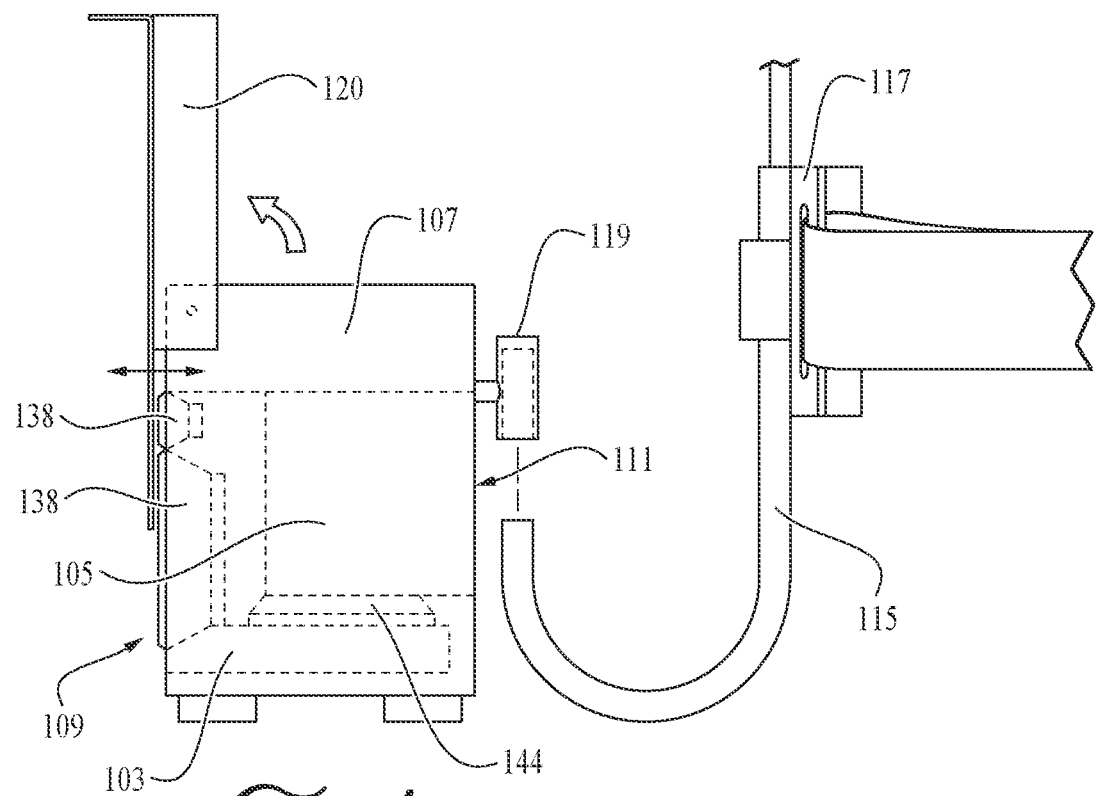
FIG. 4 is a side plan view of a portion of the system of FIG. 1, wherein a lid has bene opened.
Figure 5:
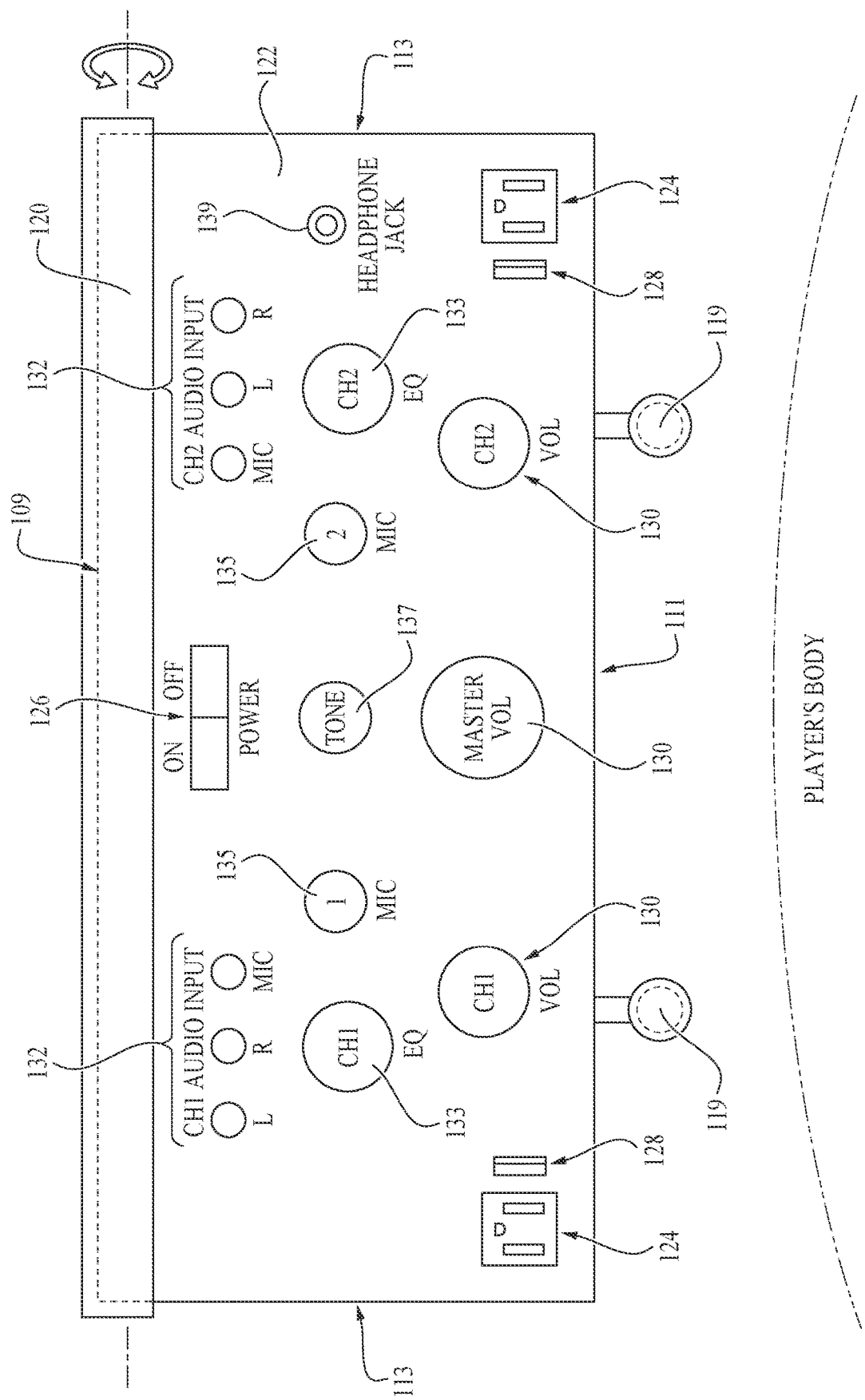
FIG. 5 is a top plan view of the top surface of the housing of FIG. 4.

Optionally, the housing 104 has a lower chamber 103, a middle chamber 105, and an upper chamber 107 that are best seen in FIG. 4. Inside the upper chamber 107 of the housing 104, under the top surface 122, there is an AC adapter that is a DC to AC inverter that is coupled to the AC power outlets 124 in the top surface 122 of the housing 104.

Inside the middle chamber 105 there is at least one, and preferably two or more, speakers 138 for projecting the sound of the electric instrument being played. The speakers 138 are coupled to the front surface 109 of the housing and project sound out and away from the user 106 and the housing 104. Also, inside the middle chamber 105 of the housing 104 there is a rechargeable and optionally removable, battery and/or battery pack (can be seen in other figures), an amplifier (can be seen in other figures), and a subwoofer 144. The amplifier can be at least a 100-watt Class D amplifier. The amplifier and speakers 138 create a self-contained PA system, and as noted above, there can be a plurality of channels for stereo audio, each with their own means to adjust/control volume, tone attenuation and audio mixing.

The lower chamber 103 is the wave form chamber, and the subwoofer 144 fires/projects sound down into the lower chamber 103. The lower chamber 103 has a sound outlet port 142 that allows the subwoofer 144 sound to exit the housing 104. The speakers 138 and the subwoofer 144 form a 3-way speaker system (left, right and bass).

Removably or permanently coupled to the cover 120 (or optionally, directly coupled to the side surfaces 113 of the housing 104) is a first bracket 150 that is configured to support and removably couple to a playing surface, musical instrument, controller and/or controller surface. The musical instruments, controller and/or control surfaces include but are not limited to electronic keyboards, disc jockey (DJ) type controllers, electronic percussion instruments, alternative musical instruments, drum machines, etc. In FIG. 1, the musical instrument is a keyboard 152, but any musical instrument/playing surface could be coupled to the bracket 150. The first bracket 150 comprises at least one flat portion 154 with at least one rear lip 156 and the flat portion 154 removably couples to the cover 120 with at least one, but preferably, a plurality of fasteners 158.

The housing 104 can be any shape and is not limited to the cube and or rectangular prism shapes shown in the Figures. The housing 104 can be made from metal such as aluminum, titanium or similar lightweight alloy metal, or a composite material, such as a plastic, metal or carbon/carbon fiber composite, or a metallic material that can be made via 3-D printing, and any combination of the foregoing.

Figure 2:
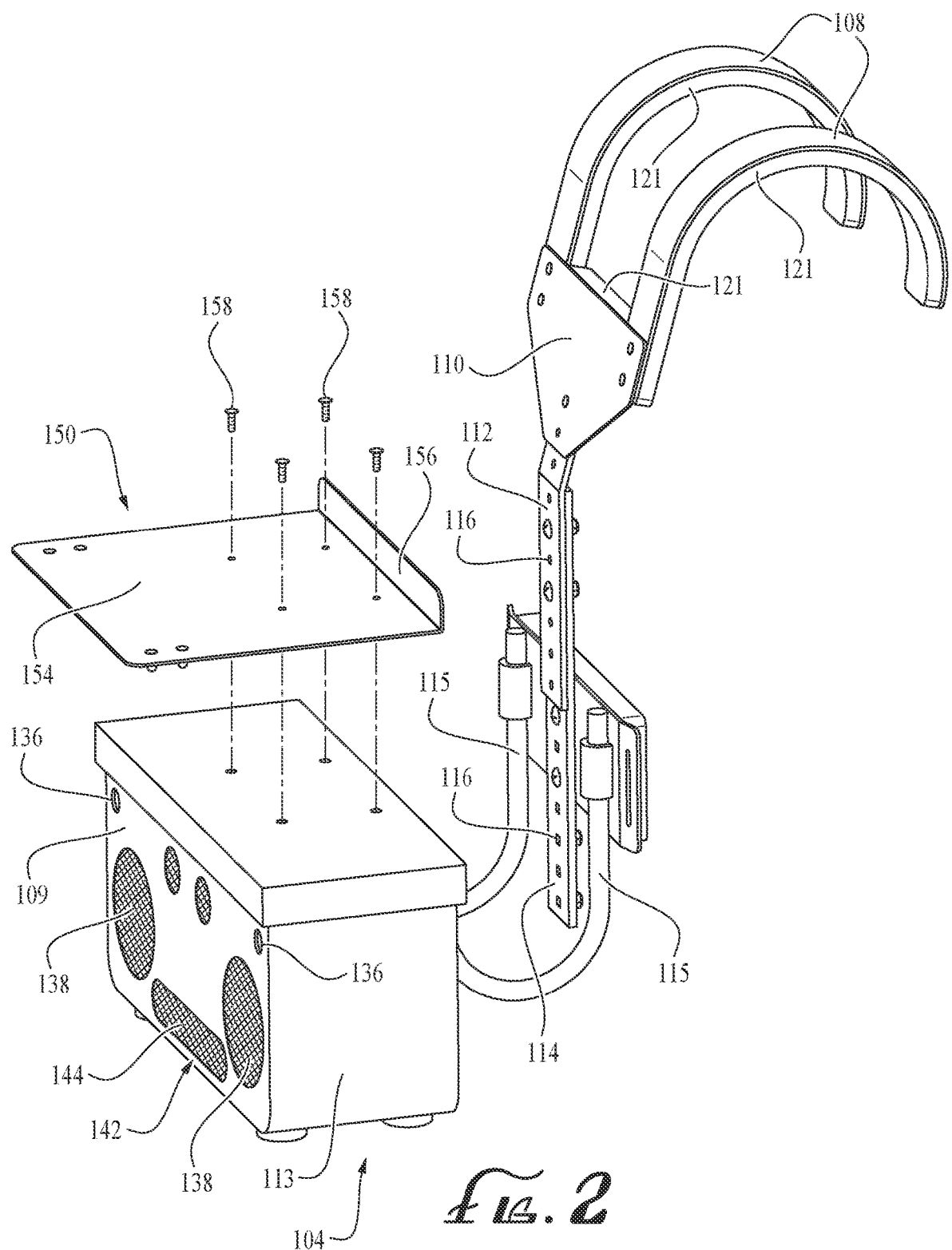
FIG. 2 is an exploded view of the system of FIG. 1.
Figure 3:
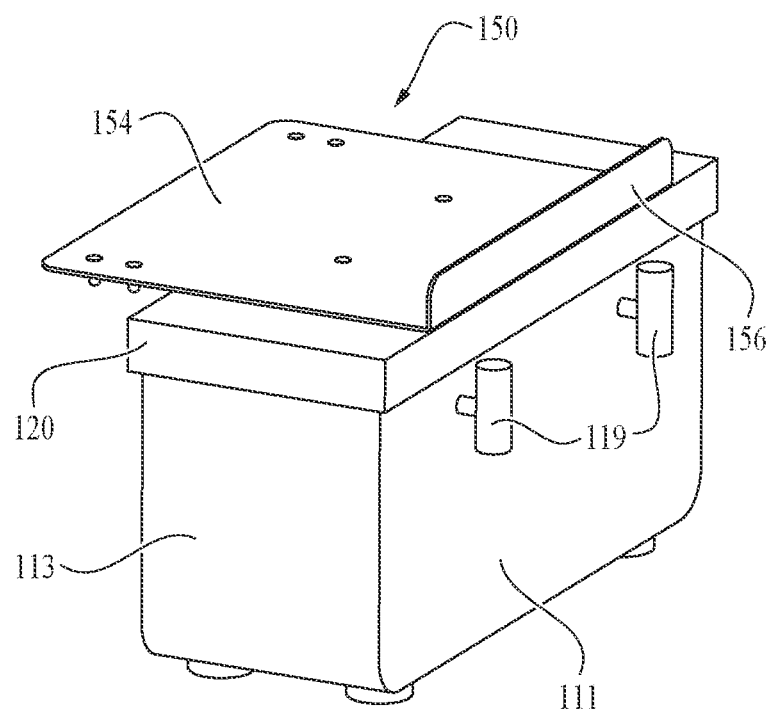
FIG. 3 is a rear perspective view of a portion of the system of FIG. 1.

The housing 104 attaches to the supports 112, 114 in one of two ways. The first option, which is shown in FIGS. 2 through 4, is through the use of two J-hooks 115. One end of each J-hook 115 is coupled to a support plate 117 that is coupled one or both of the supports 112, 114. An other end of the J-hooks 115 is inserted through holders 119 that are coupled to the rear surface 111 of the housing 104. The support plate 117 can be strapped to the mid-section of the user 106, providing additional support to the system 100.

Figure 10:
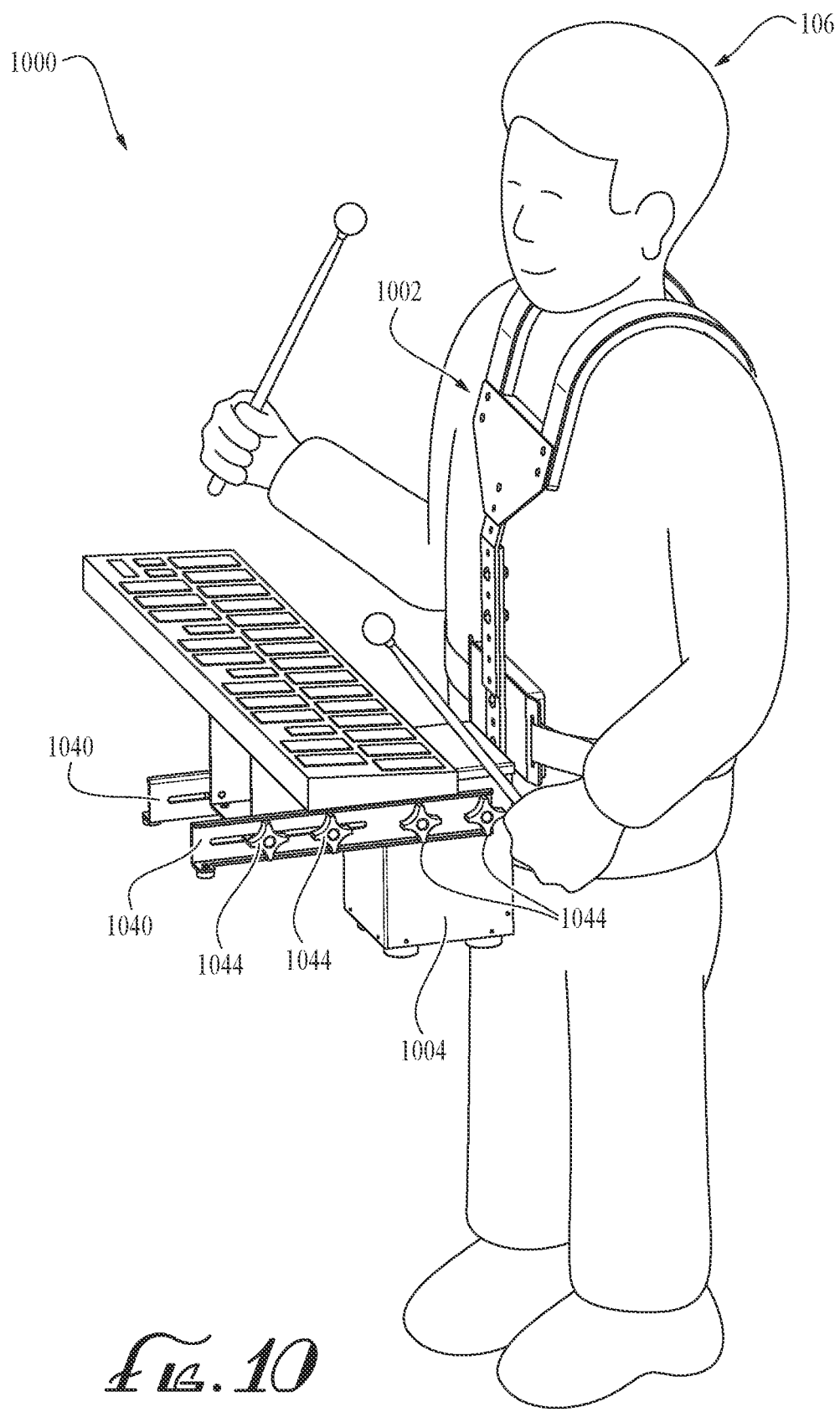
FIG. 10 is a side perspective view of a fourth embodiment of a wearable music system having features of the present invention, wherein the system is shown being worn by a user.
Figure 11:
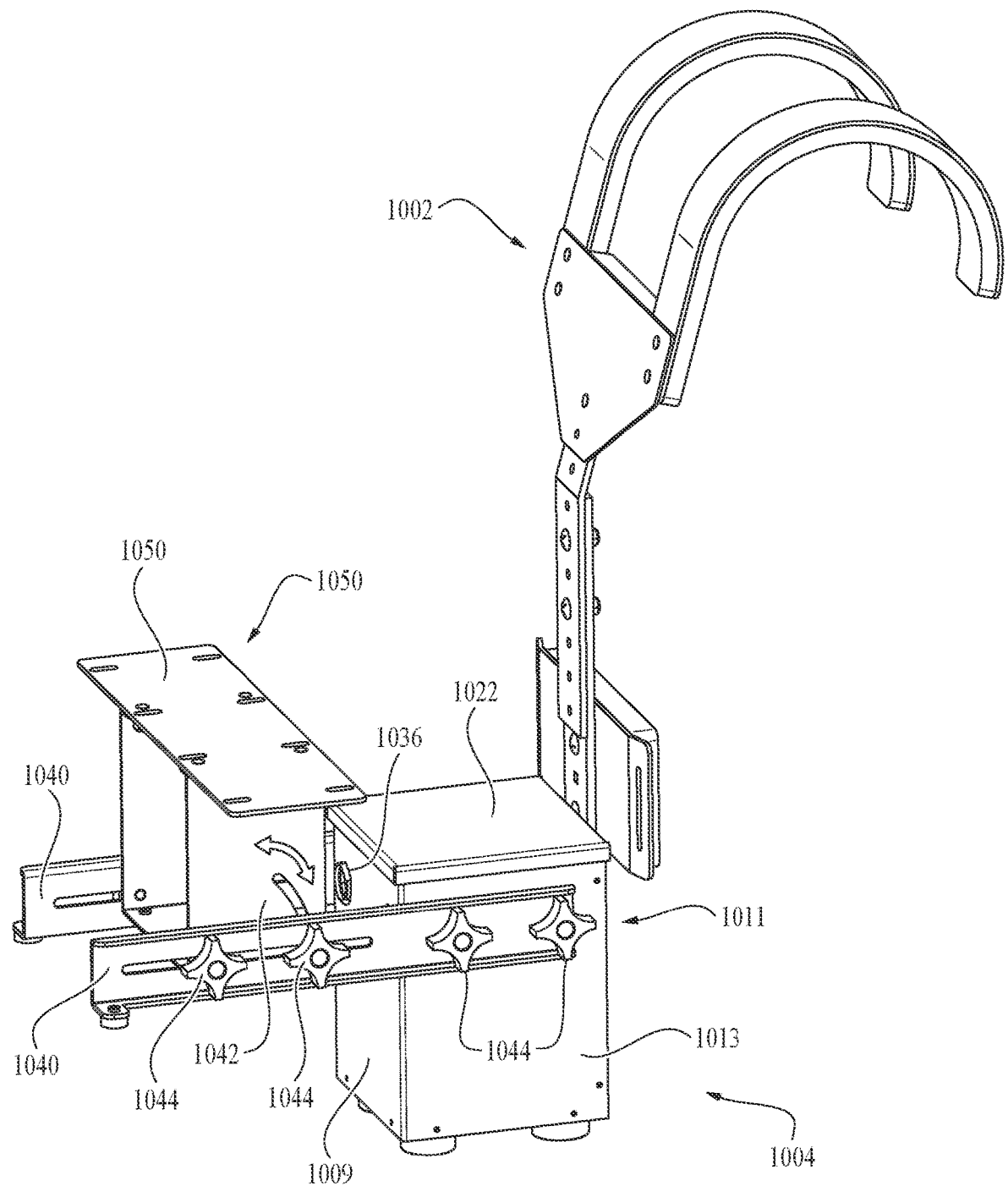
FIG. 11 is a side perspective view of the system of FIG. 10.
Figure 12:
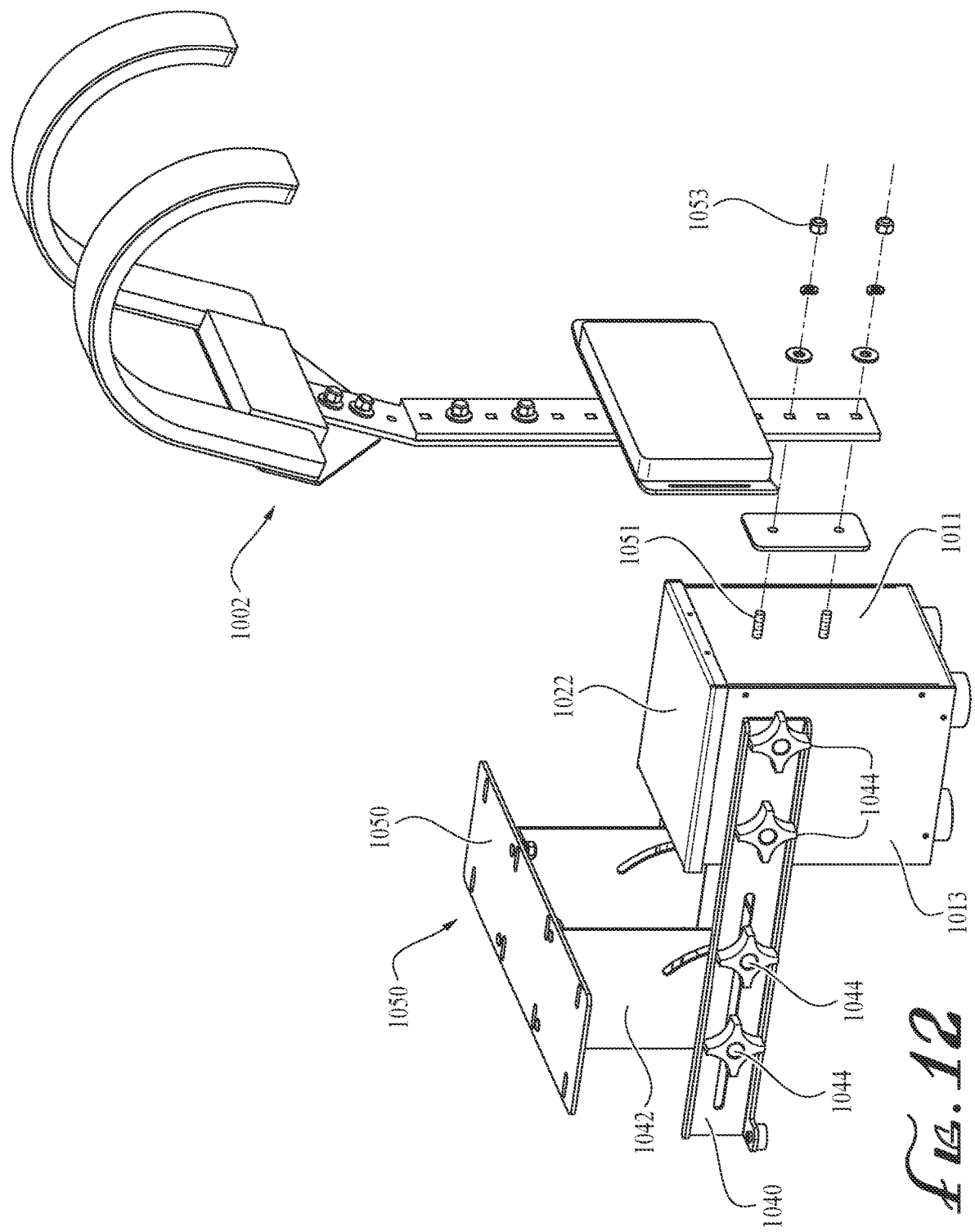
FIG. 12 is a rear, exploded, perspective view of the system of FIG. 11.

The second option is shown in FIG. 12 and relates to the embodiments shown in FIGS. 6 through 12. The housing 1004 couples to the supports 112, 114 using connector pins 1051 that extend from a rear surface 1009 of the housing 1004. The connector pins 1051 extend through the openings 116 in the supports 112, 114 and are secured with at least one nut 1053. This provides a quick-mount connection mechanism for the housing 1004. The connector pins 1051 can be threaded such that they mate with a nut 1053, or the connector pins 1051 can be smooth and have at least one opening at their free ends for insertion of a coder pin (not shown) therethrough.

Figure 6:
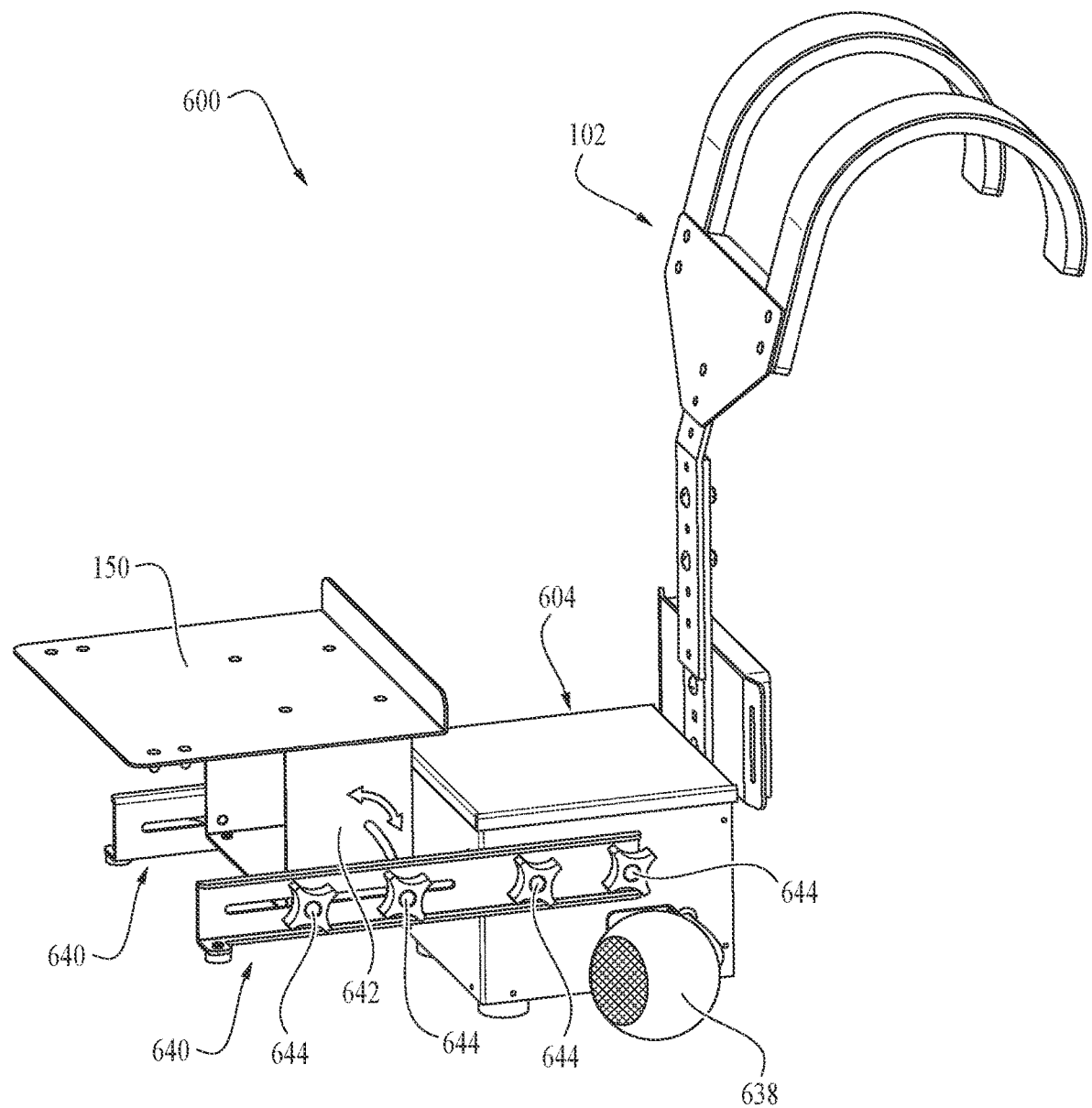
FIG. 6 is a perspective view of a second embodiment of a wearable music system having features of the present invention.
Figure 7:
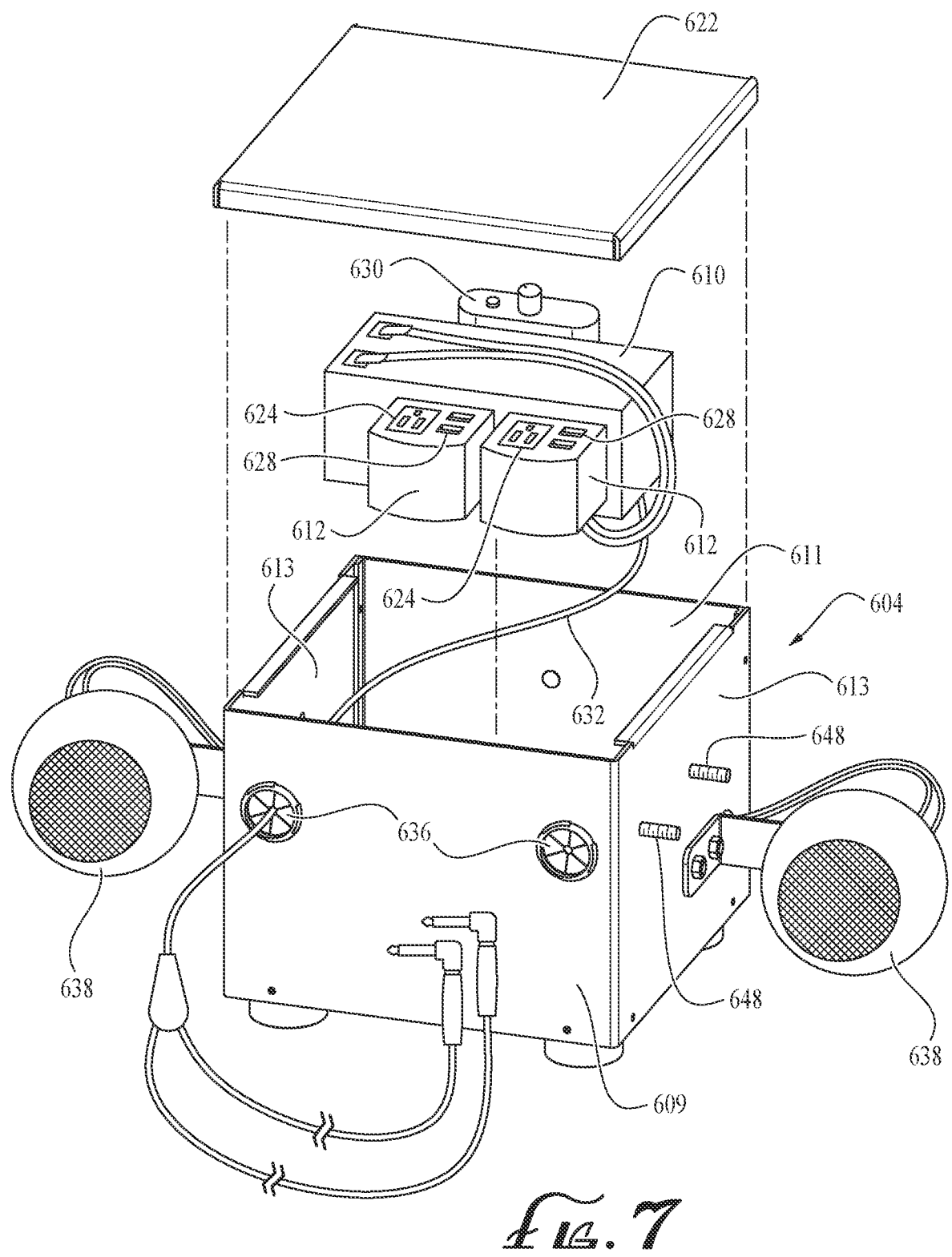
FIG. 7 is an exploded front perspective view of the system of FIG. 6.

Referring now to FIGS. 6 and 7, there is shown a second embodiment of a wearable music system 600 having features of the present invention. In this embodiment 600, the harness 602 and its components are the same as discussed above with respect to the harness 102 of the first embodiment 100. However, the connection mechanism between the housing 604 and the harness 602 is that of FIG. 12.

The housing 602 of the second embodiment 600 has a front surface 609 that is distal the user/wearer 106, a rear surface 611 that is proximate the user 106, two opposed side surfaces 613, a bottom surface, and top surface 622. In this embodiment, the top surface 622 removably couples to the side surfaces 613 and the front and rear surfaces 609, 611 by overlapping their top edges, as shown in FIG. 7, and remains in place through friction fitting. Preferably the top surface 622 is water resistant such that it seals to the housing 604 with a rubber seal and/or O-ring, and the front surface 609 can have at least one cable port 636 therethrough.

The internal components of the housing 602 are best seen in FIG. 7. There is at least one rechargeable and optionally removable battery and/or battery pack 610 and at least one inverter 612 coupled to the battery 610. Each inverter 612 has at least one power outlet 624 and at least one USB port 628. Additionally, there is at least one amplifier 630 electrically coupled to the battery 610 and at least one of the inverters 612. Preferably there are two inverters 612, one for the amplifier 630 and one for the musical instrument being used.

Coupled to the amplifier 630 is at least one audio cable 632 that extends out of the housing 604 through one or more of the ports 636. Coupled to one or both of the side surfaces 613 of the housing 604 is one or more speakers 638.

Like in the first embodiment 100, the second embodiment 600 can also have the first bracket 150 coupled thereto. However, the second embodiment 600 offers the use of an additional feature: a pair of arms 640 that have one end removably and adjustably coupled to the housing 604 and extend away from the front surface 609 of the housing 604. The other end of the arms 640 (their free ends) removably and adjustably couple to a rotatable platform 642. The possible rotation of platform 642 is shown in FIG. 6 with the arrow. The first bracket 150 is coupled to the platform 642, and due to the rotation of the platform 642, the angle at which the first bracket 150 is presented to the user can be adjusted. A plurality of rotatable screw knobs 644 are used to secure to the arms 640 to the housing 604 via threaded pins 648, and to secure the platform 642 to the arms 640 via threaded pins that are coupled to and extend from side surfaces of the platform 642.

Figure 8:
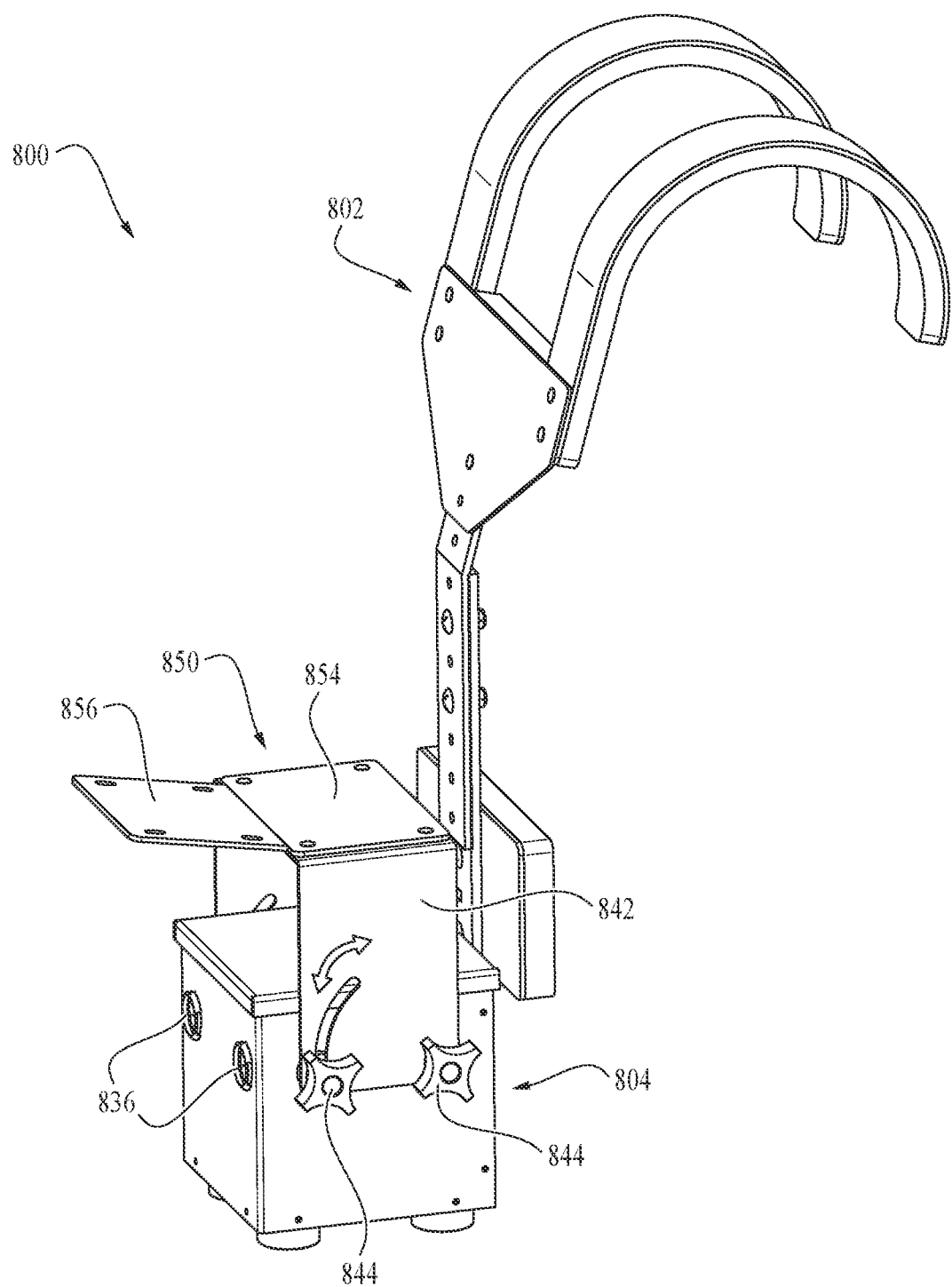
FIG. 8 is a side perspective view of a third embodiment of a wearable music system having features of the present invention.
Figure 9:
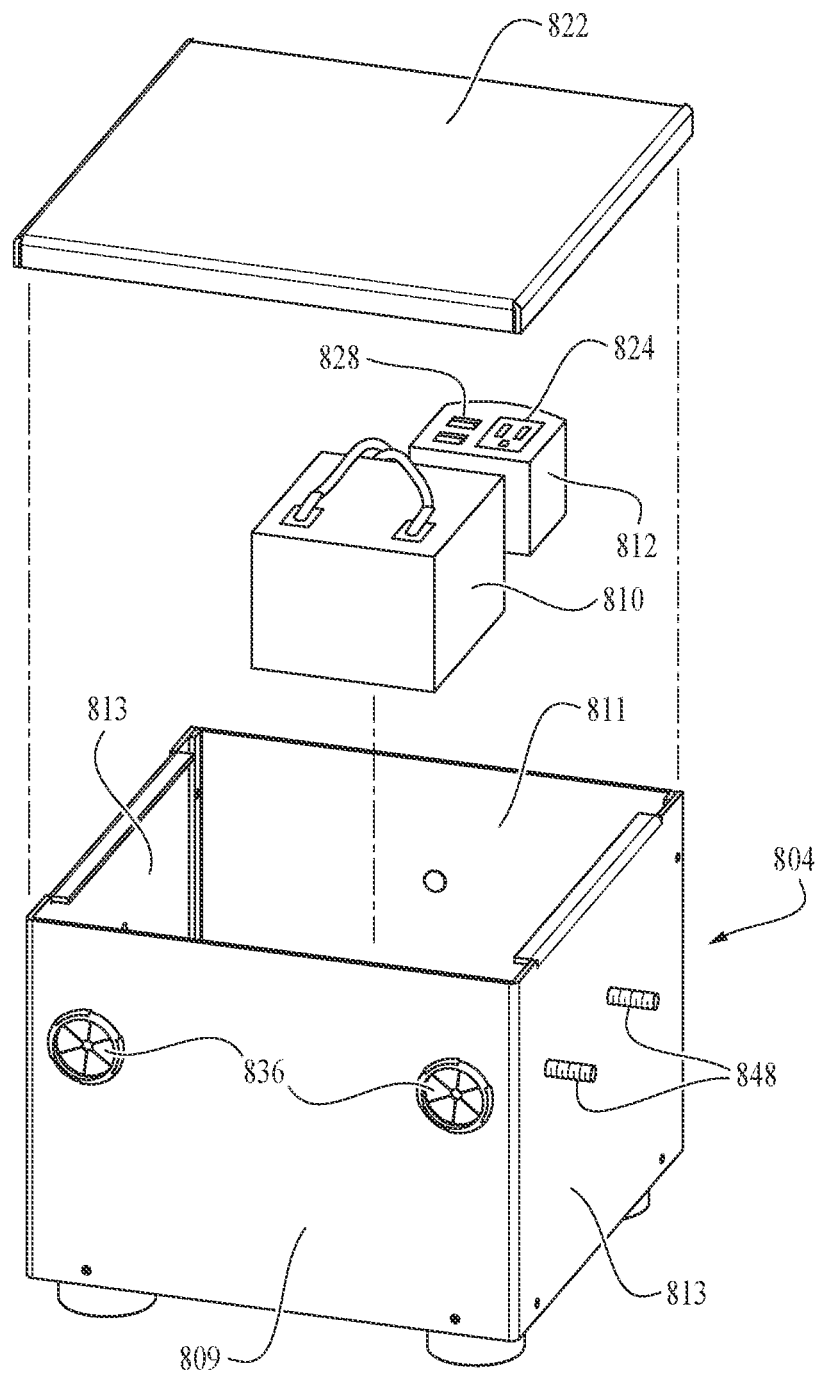
FIG. 9 is an exploded view of a portion of the system of FIG. 8.

Referring now to FIGS. 8 and 9, there is shown a third embodiment 800 of a wearable music system having features of the present invention. In this embodiment 800, the harness 802 and its components are the same as discussed above with respect to the harness 602 of the second embodiment 600. The structure of the housing 802 is the same as that of the housing 602 of the second embodiment 600, wherein there is a front surface 809 that is distal the user/wearer 106, a rear surface 811 that is proximate the user 106, two opposed side surfaces 813, a bottom surface, and top surface 822. In this embodiment, the top surface 822 removably overlaps the top edges of the side surfaces 813, and the front and rear surfaces 809, 811, as shown in FIG. 9, and remains in place through friction fitting. Preferably the top surface 822 is water resistant such that it seals to the housing 804 with a rubber seal and/or O-ring, and the front surface 809 can have at least one cable port 836 therethrough.

The third embodiment 800 shows the use of a second bracket 850. This second bracket 850 can be removably coupled to the housing 804, preferably via a rotatable platform 842. The second bracket 850 has at least one flat portion 854 with at least one front, angled portion 856 that is angled towards the user, wherein the flat portion 854 removably couples to the platform 842 with at least one, but preferably, a plurality of fasteners.

The possible rotation of platform 842 is shown in FIG. 8 with the arrow. The second bracket 850 is coupled to the platform 842, and due to the rotation of the platform 842, the angle at which the second bracket 850 is presented to the user can be adjusted. A plurality of rotatable screw knobs 844 are used to secure to the platform 842 to the housing 804 via pins 848.

Referring now to FIGS. 10 through 12, there is shown a fourth embodiment of a wearable music system 1000 having features of the present invention. In this embodiment 1000, the harness 1002 and its components are the same as discussed above with respect to the harness 602 of the second embodiment 600. The structure of the housing 1002 is the same as that of the housing 602 of the second embodiment 600, wherein there is a front surface 1009 that is distal the user/wearer 106, a rear surface 811 that is proximate the user 106, two opposed side surfaces 1113, a bottom surface, and top surface 1122. In this embodiment, the top surface 1122 removably couples to/overlaps the side surfaces 1113 and the front and rear surfaces 1109, 1111. Preferably the top surface 1022 is water resistant such that it seals to the housing 1004 with a rubber seal and/or O-ring, and the front surface 1009 can have at least one cable port 1036 therethrough.

As discussed above, the housing 1004 couples to the supports 112, 114 using at least one connector pin 1051 that extends from the rear surface 1009 of the housing 1004. The connector pin(s) 1051 extend through the opening(s) 116 in the supports 112, 114 and are secured with at least one nut 1053. Optionally, the pins 1051 can be secured with one or more coder pins (not shown).

The fourth embodiment 1000 shows the use of a third bracket 1050. This third bracket 1050 can be removably coupled to the housing 1004, preferably via a rotatable platform 1042. The rotatable platform 1042 is coupled either directly to the housing 1004 or coupled to a pair of arms 1040 that have one end removably and adjustably coupled to the housing 1004 and extend away from the front surface 1009. The other end of the arms 1040 (their free ends) removably and adjustably couple to a rotatable platform 1042. The third bracket 1050 has at least one flat portion 1054 that removably couples to the platform 1042 with at least one, but preferably, a plurality of fasteners.

The possible rotation of the platform 1042 is shown in FIG. 11 with the arrow. The third bracket 1050 is coupled to the platform 1042, and due to the rotation of the platform 1042, the angle at which the third bracket 1050 is presented to the user can be adjusted. A plurality of rotatable screw knobs 1044 are used to secure to the arms 1040 to the housing 1004 via threaded pins (not shown), and to secure the platform 1042 to the arms 1040.

Figure 13:
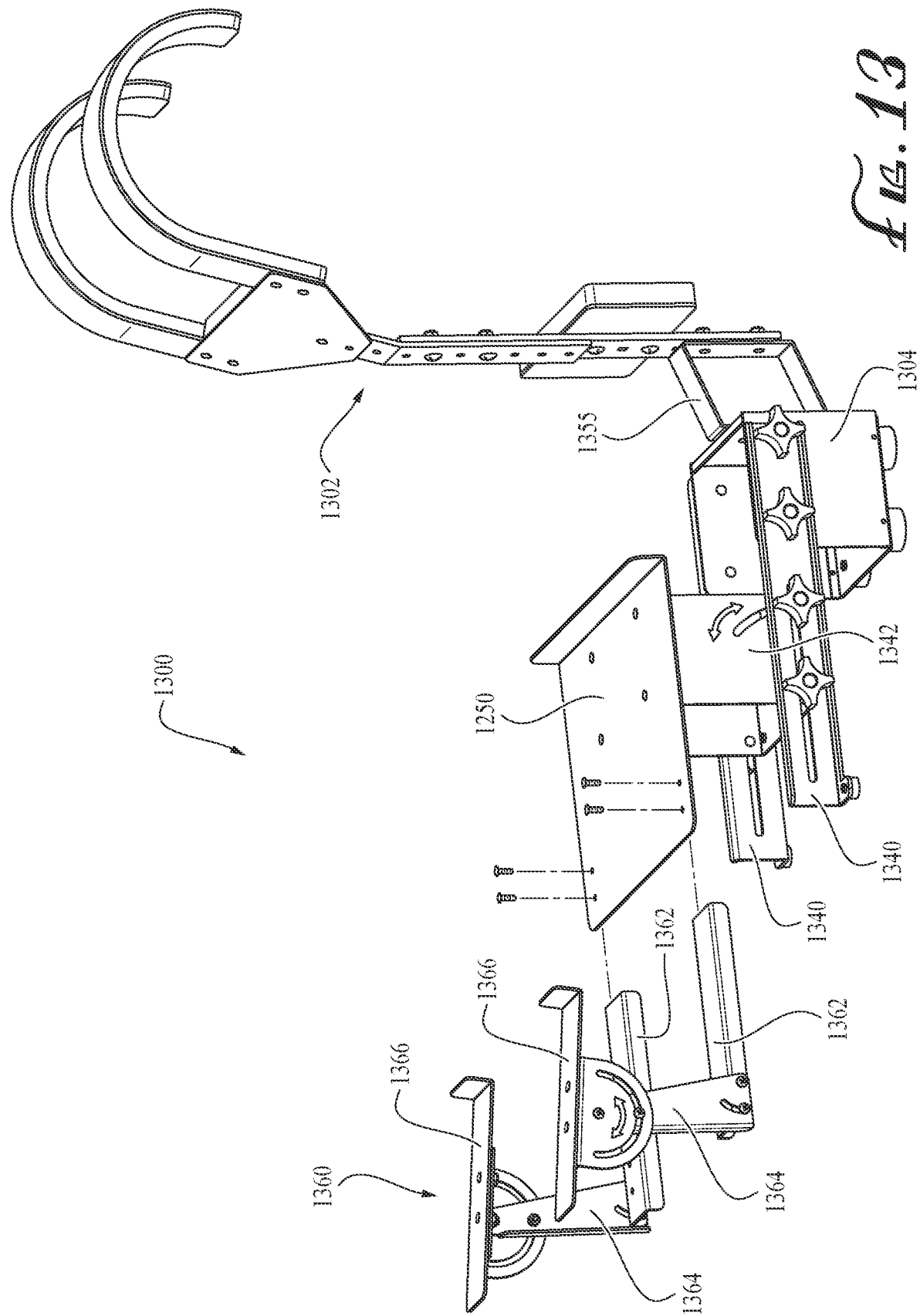
FIG. 13 is a side perspective view of the system of FIG. 11, wherein a different play surface is shown and an additional bracket can be added.
Figure 14:
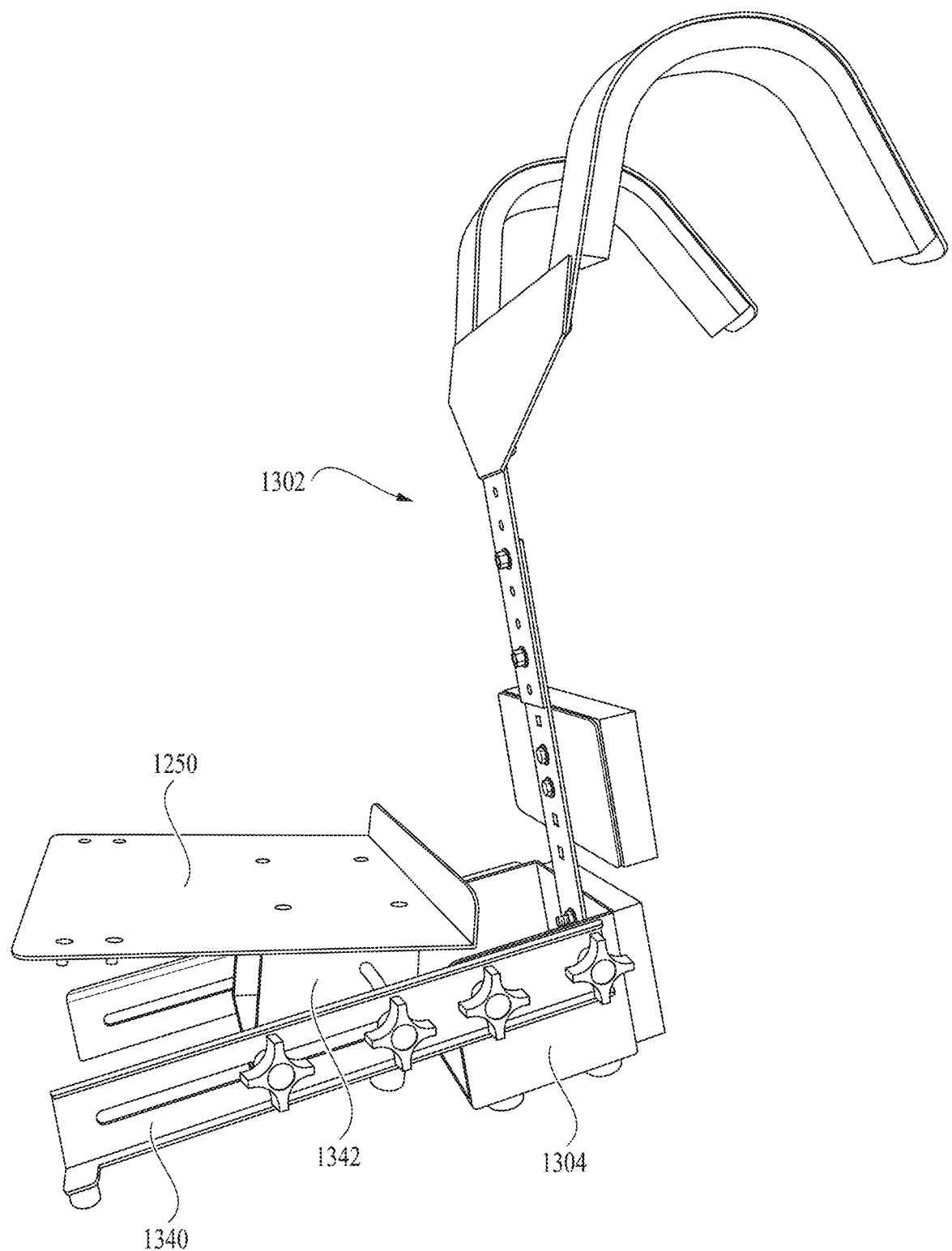
FIG. 14 is a perspective view of the system of FIG. 13, wherein some elements have been removed to provide a more simplified version of the system.

Referring now to FIG. 13, there is shown a possible combination of a harness 1302 (having the same features noted above with respect to the other embodiments), a housing 1304 having an open top and an open front, a pair of arms 1340 (same as described above), a rotatable platform 1342 (same as described above), a first bracket 1350 (same as described above), and a fully adjustable rack 1360.

The fully adjustable rack 1360 comprises a pair of horizontal arms 1362 that have one end coupled to the first bracket 1350 and an other end rotatably coupled to one end of a pair of vertical arms 1364. The other ends of the pair of vertical arms 1364 are rotatably coupled to a pair of holders 1366. The rack 1360 allows for use of a secondary musical instrument and/or supportive controller device.

The system 1300 shown in FIG. 13 also incorporates the use of an optional extender support 1355 that couples the housing 1304 to the harness 1302, but spaces the housing 1304 away from the user 106, as opposed to being up against the user's body 106.

The various platforms, brackets, and arms discussed above provide a means to mount a supportive bracket 150, 850, 1050, 250, 1360 for holding/coupling to electronic musical instruments at a comfortable position away from player's body 106. The various components of the systems 100, 600, 800, 1000, 1300 are adjustable such that the distance from user's body and be adjusted for enhanced comfortability of musical instrument playing position.

Additionally, the angle of the instrument being played with respect to the user can also be adjusted to achieve a more comfortable position.

The system 100, 600, 800, 1000, 1300 can have wireless connectivity in the form of Bluetooth, and audio and MIDI (musical instrument digital interface) 2-way wireless transmitter technology. MIDI is a way to connect devices that make and control sound—such as synthesizers, samplers, and computers—so that they can communicate with each other, using MIDI messages.

It should be noted that any combination of the harnesses, housings, arms, brackets, platforms, internal and external housing components described above can be used in any combination with each other and are not limited to the specific configurations of each embodiment discussed above.

The system 100, 600, 800, 1000, 1300 provides all the supportive elements needed for electronic musical instruments to be fully implemented by marching bands in both indoor and outdoor performance environments, in a single unit (housing 104, 604, 804, 1004, 1304) that is compatible with existing marching carriers, or general marching instrument harness designs.

The system 100, 600, 800, 1000, 1300 enables electronic musical instruments to be used in live performance without the burden of power supply via static AC cable, wireless transmitter audio latency or bulky, cumbersome audio reinforcement equipment.

Marching bands may now include electronic musical instruments as one additional voice among the ensemble of acoustic musical instruments and maintain dynamic audio levels during mobile, performance, either indoor or outdoor.

Electronic musicians can now benefit from mobility via the system 100, 600, 800, 1000, 1300 of the present invention by providing a body worn musical instrument stand, with combined power source, amplification and speakers, creating a self-contained, mobile PA system.

The system 100, 600, 800, 1000, 1300 of the present invention has the following advantageous features:

- A marching style carrier harness 102, 602, 802, 1002, 1302 with multi adjustable brackets and instrument surfaces;
- A rechargeable battery power source with DC/AC inverter and power outlets;
- A self-contained PA system with Class D stereo amplifier, volume and tone adjustment;
- Two channels of audio input, providing independent level mixing control;
- Separate audio and microphone inputs to augment musical instruments;
- Two or three-way stereo speakers facing forward away from the wearers' body;
- A sound wave enhancement chamber 103 for increased amplitude of low frequency audio;
- An acoustic port 142 to focus and direct sound in a broad pattern;
- Additional wireless technology connectivity options contained within unit (audio, midi, Bluetooth)

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference.

The present invention has the following features:
1. A portable music system comprising:
   a) a "Y" shaped harness comprising:
      i) two curved pieces;
      ii) a central section coupled to the two curved pieces;
      iii) a first vertical support coupled to the central section, the first vertical support having a plurality of holes there through; and
      iv) a second vertical coupled to the first vertical support, the second vertical support having a plurality of holes there through; and
   b) a housing comprising:
      i) a front surface having at least one cable port there through;
      ii) a back surface having at least one connector pin for coupling to harness;
      iii) a top surface having at least one AC power socket, an on/off switch, at least one USB port, at least one volume control knob, and at least one audio input;
      iv) a bottom surface;
      v) two side surfaces, each side surface having at least one mount coupled thereto;
      vi) a water resistant cover that can pivot between an open position revealing the top surface of the housing, and a closed position wherein the top surface of the housing cannot be accessed;
      vii) an upper chamber having an AC adapter located therein;
      viii) a middle chamber having at least one speaker coupled to the front surface of the housing, at least one battery and/or battery pack, an amplifier and a subwoofer; and
      ix) a lower chamber into which the subwoofer projects sound, the lower chamber having a sound outlet port in the front and two side surfaces of the housing.
2. The system of feature 1, further comprising:
   a) a platform; and
   b) a plurality of brackets for coupling to an exterior of the housing.

What is claimed is:
1. A carrier harness system for electronic musical instruments comprising:
   a) a harness comprising:
      i) two curved pieces;
      ii) a central section coupled to the two curved pieces;
      iii) at least one vertical support coupled to the central section, the vertical support having a plurality of holes there through; and
      iv) a support plate coupled to the at least one support;
   b) a structure for supporting at least one electronic musical instrument, the structure comprising:
      i) a rear surface having at least one connector pin to couple to the at least one vertical support of harness, the rear surface disposed proximate the user;
      ii) a bottom surfaces; and
      iii) two side surfaces;
   c) a pair of arms coupled to each side surface of the structure, each of the arms having at least one longitudinal opening therethrough;
   d) a rotatable platform having:
      i) a top surface;
      ii a bottom surface; and
      iii) two side surfaces, wherein the side surfaces each have at least one arcuate opening therethrough, wherein the rotatable platform is rotatably coupled to the pair of arms; and
   e) a first bracket coupled to the platform.
2. The system of claim 1, wherein the first bracket comprises a flat portion and a rear lip, and the flat portion of the bracket is configured to couple to the rotatable platform.
3. The system of claim 1, wherein the first bracket comprises a flat portion and a front angle portion, the flat portion configured to couple to the platform.
4. The system of claim 1, wherein the first bracket comprises a flat portion configured to couple to the platform.
5. The system of claim 1, wherein the rotatable platform further comprises at least one power source.
6. The system of claim 1, further comprising at least one power source supported by the structure.
7. The system of claim 1, further comprising at least one speaker and at least one amplifier supported by the structure.
8. A carrier harness system for electronic musical instruments comprising:
   a) a harness comprising:
      i) two curved pieces;
      ii) a central section coupled to the two curved pieces; and
      iii) at least one vertical support coupled to the central section, the vertical support having a plurality of holes there through;
   b) a structure for supporting at least one musical instrument, the structure comprising:
      i) a rear surface disposed proximate a user; and
      ii) two side surfaces;
   c) a pair of arms coupled to each side of the structure; and
   d) a rotatable platform rotatably coupled to the pair of arms, the rotatable platform having:
      i) two side surfaces; and
      ii) a bottom surface.
9. The system of claim 8, further comprising a first bracket coupled to the platform.
10. The system of claim 9, wherein the first bracket comprises a flat portion and a rear lip, and the flat portion of the bracket is configured to couple to a top surface of each of the sides of the rotatable platform.
11. The system of claim 10, further comprising a fully adjustable rack that comprises:
   a) a pair of horizontal arms that have a first end coupled to the first bracket;
   b) a pair of vertical arms, wherein the first end of the vertical arms are rotatably coupled to a second end of the horizontal arms; and
   c) a pair of holders rotatably coupled to a second end of the vertical arms.
12. The system of claim 8, wherein the rear surface of the structure has at least one connector pin to couple to the at least one vertical support of harness.
13. The system of claim 8, further comprising at least one power source supported by the structure.
14. The system of claim 8, further comprising at least one speaker and at least one amplifier supported by the structure.
15. A carrier harness system electronic musical instruments comprising:
   a) a "Y" shaped harness comprising:
      i) two curved pieces;
      ii) a central section coupled to the two curved pieces; and
      iii) at least one vertical support coupled to the central section, the vertical support having a plurality of holes there through;

b) a structure for supporting at least one electronic musical instrument, the structure comprising:
  i) a rear surface disposed proximate a user; and
  ii) and two side surfaces;
c) a pair of arms adjustably coupled to the side surfaces of the structure;
d) a rotatable platform coupled to the arms, the rotatable platform comprising two side surfaces; and
e) a first bracket coupled to the platform.

16. The system of claim 15, wherein the rotatable platform further comprises at least one amplifier coupled thereto.

17. The system of claim 15, wherein the rear surface of the structure has at least one connector pin to couple to the at least one vertical support of harness.

18. The system of claim 15, wherein the rotatable platform further comprises a bottom surface.

19. The system of claim 15, further comprising at least one power source supported by the structure.

20. The system of claim 15, further comprising at least one speaker and at least one amplifier supported by the structure.

* * * * *